(12) United States Patent
Kim et al.

(10) Patent No.: US 9,128,527 B2
(45) Date of Patent: Sep. 8, 2015

(54) MOBILE TERMINAL AND TOUCH RECOGNIZING METHOD THEREIN

(75) Inventors: Minjoo Kim, Seoul (KR); Chilwoo Lee, Gwangju (KR); Yungho Seo, Gwangju (KR); Chimin Oh, Gwangju (KR); Jaedo Kwak, Seoul (KR); Jonggu Kim, Jeonnam (KR)

(73) Assignees: LG ELECTRONICS INC., Seoul (KR); INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 402 days.

(21) Appl. No.: 13/287,062

(22) Filed: Nov. 1, 2011

(65) Prior Publication Data

US 2012/0169670 A1   Jul. 5, 2012

(30) Foreign Application Priority Data

Dec. 29, 2010   (KR) .................. 10-2010-0137503

(51) Int. Cl.
*G06F 3/01* (2006.01)
*G06F 3/042* (2006.01)
*G06F 3/0488* (2013.01)

(52) U.S. Cl.
CPC ............. *G06F 3/017* (2013.01); *G06F 3/0425* (2013.01); *G06F 3/04883* (2013.01); *G06F 2203/04808* (2013.01)

(58) Field of Classification Search
CPC ... G06F 3/017; G06F 3/04883; G06F 3/0487; G06F 3/0488; G06F 3/04886; G06F 2203/04808

See application file for complete search history.

(56) References Cited

U.S. PATENT DOCUMENTS

| | | | | |
|---|---|---|---|---|
| 8,839,156 | B2 * | 9/2014 | Backer et al. ................. | 715/863 |
| 2008/0168403 | A1 * | 7/2008 | Westerman et al. .......... | 715/863 |
| 2008/0180408 | A1 * | 7/2008 | Forstall et al. ................ | 345/177 |
| 2008/0211778 | A1 * | 9/2008 | Ording et al. ................. | 345/173 |
| 2008/0273755 | A1 * | 11/2008 | Hildreth ........................ | 382/103 |
| 2009/0195539 | A1 * | 8/2009 | Kim et al. ..................... | 345/419 |
| 2009/0309765 | A1 * | 12/2009 | Wang et al. .................... | 341/20 |
| 2010/0045608 | A1 * | 2/2010 | Lessing ......................... | 345/173 |
| 2010/0053104 | A1 * | 3/2010 | Ahn ................................ | 345/173 |
| 2010/0159981 | A1 * | 6/2010 | Chiang et al. ............... | 455/556.1 |
| 2010/0229090 | A1 * | 9/2010 | Newton et al. ................ | 715/702 |
| 2010/0238138 | A1 * | 9/2010 | Goertz et al. ................. | 345/175 |

* cited by examiner

*Primary Examiner* — Kent Chang
*Assistant Examiner* — William Lu
(74) *Attorney, Agent, or Firm* — Lee, Hong, Degerman, Kang & Waimey

(57) ABSTRACT

A mobile terminal and touch recognizing method therein are disclosed, by which a multi-touch can be recognized. The present invention includes receiving a plurality of touches simultaneously using a touchscreen, consecutively receiving a plurality of images including a plurality of the received touches for a predetermined time using a camera provided under the touchscreen, determining patterns and pattern changes of a plurality of the touches included in a plurality of the images, respectively, and recognizing a gesture by a plurality of the touches in accordance with a result of the determining step. Moreover, the touch pattern includes at least one selected from the group consisting of a touch number, a touch point, a touch size and a touch figure.

15 Claims, 14 Drawing Sheets

FIG. 4
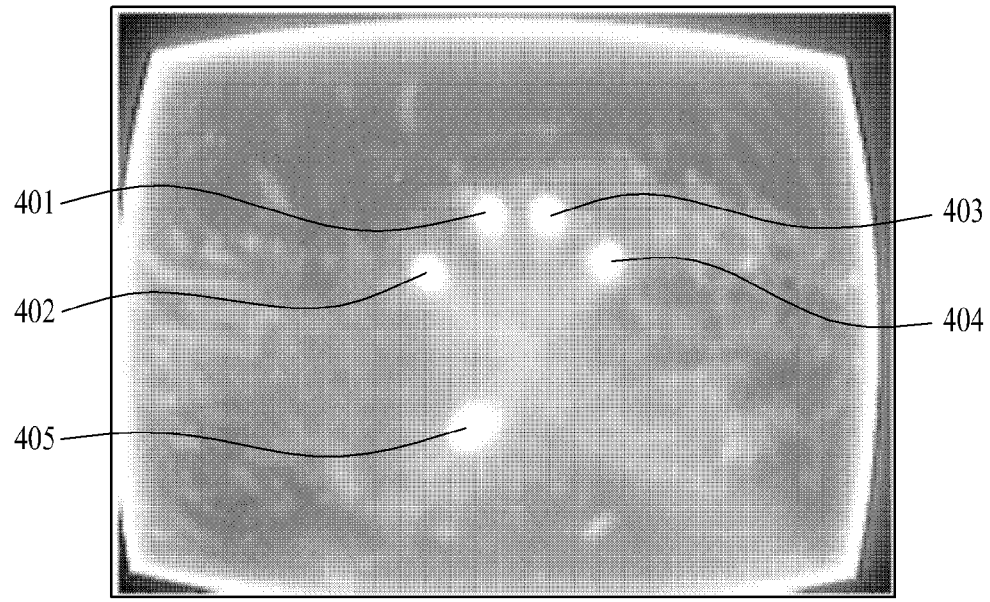
(a)
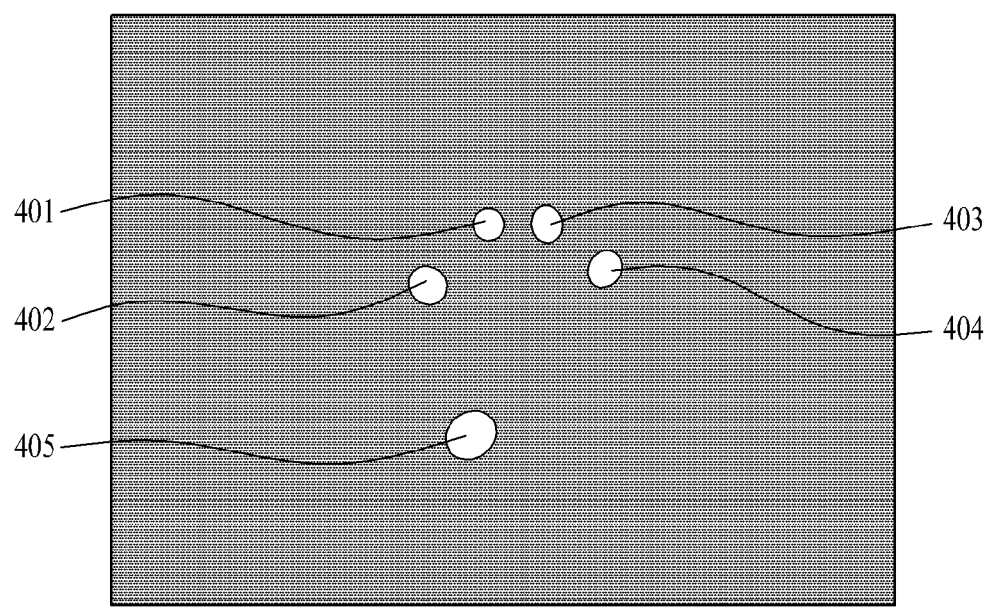
(b)

FIG. 5A

| | Gesture | Action | | Gesture inputting method |
|---|---|---|---|---|
| 510 — 511 — | Click | 1 | 👆 | Tapping with index finger/simultaneous tapping while pressing with middle finger |
| 521 — 520 — 522 — | double Click | 1 | 👆X2 | Tapping twice consecutively with index finger while pressing with middle finger |
| | | 2 | ✌️ | Tapping with two fingers simultaneously |

FIG. 5B

| | Gesture | Action | | Gesture inputting method |
|---|---|---|---|---|
| 531 — 530 — 532 — | Shift | 1 | ←👆→ | Plural fingers are shifted in the same direction |
| | | 2 | ←✌️→ | |
| 541 — 540 — 542 — | Flicking | 1 | ←👆→ | Plural fingers are shifted in the same direction (fast action, flicking sense) |
| | | 2 | ←✌️→ | |

FIG. 5C

| Gesture | | Action | Gesture inputting method |
|---|---|---|---|
| Enlarge (550) | 1 (551) | | Action that space between at least two fingers increases |
| | 2 (552) | | |
| | 3 (553) | | Action of rotating finger direction outward while touched with two fingers (change of touch figure – representing fine change) |
| Reduce (560) | 1 (561) | | Action that space between at least two fingers decreases |
| | 2 (562) | | |
| | 3 (563) | | Action of rotating finger direction inward while touched with two fingers (change of touch figure – representing fine change) |

FIG. 5D

| Gesture | | Action | Gesture inputting method |
|---|---|---|---|
| Rotate (570) | 1 (571) | | Action of drawing a circle with at least two fingers |
| | 2 (572) | | |
| | 3 (573) | | While touched with at least two fingers, at least one finger is held still and the rest are rotated. |

Observed frames and lasting frames

| Angle value of each touch point | Figure of each touch point |
| --- | --- |
| (a) | (b) |

FIG. 8C
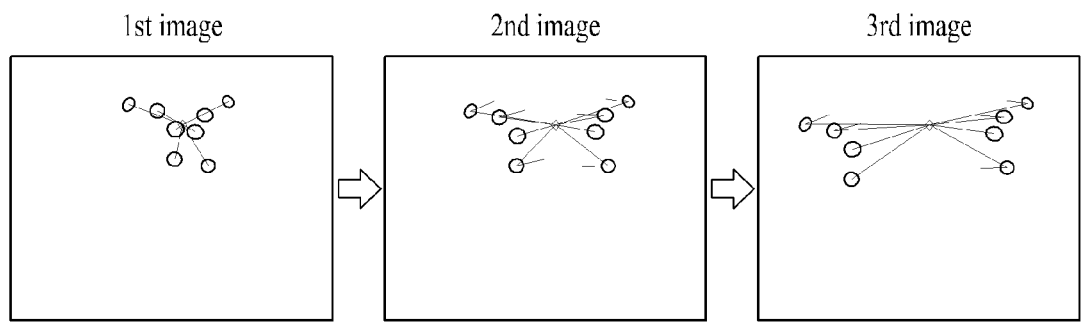
(a)
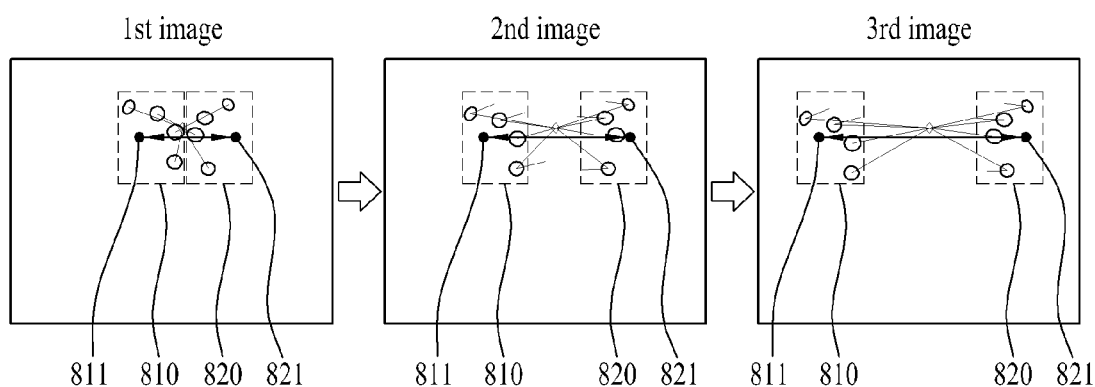
(b)

FIG. 8D
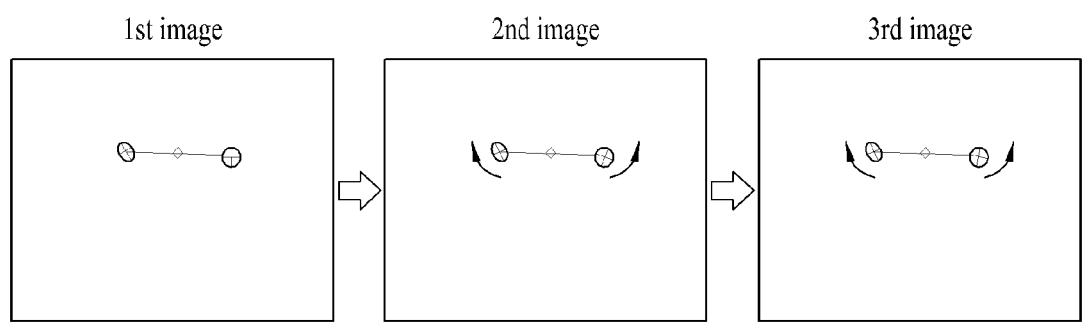
Directions of two fingers rotate inward (553) 
FIG. 8E
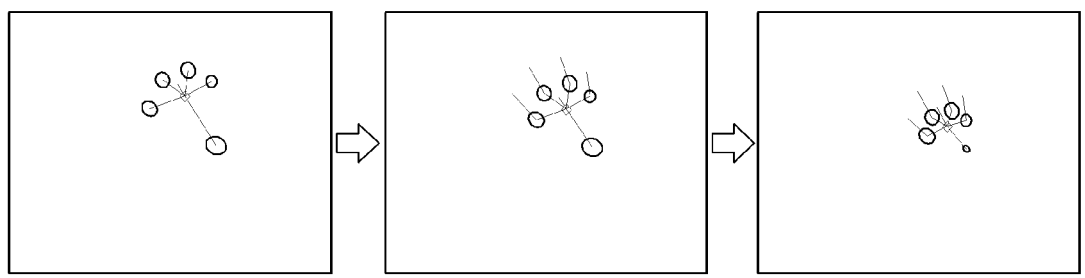
Action that a distance between at least two fingers is decreases (562) 

FIG. 8G
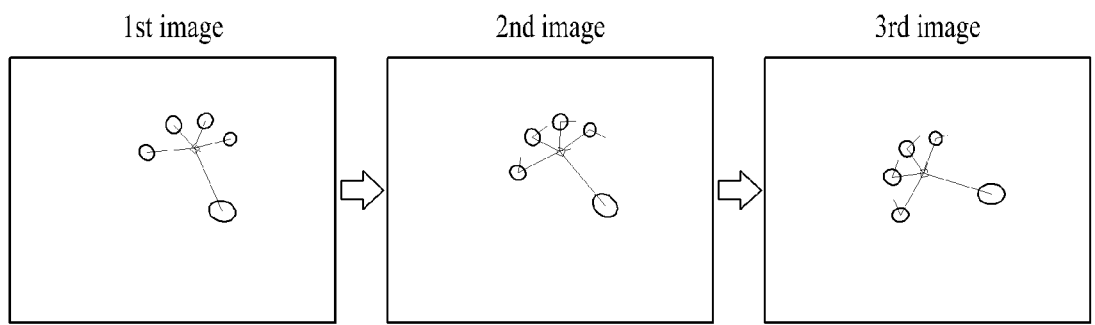
(a)
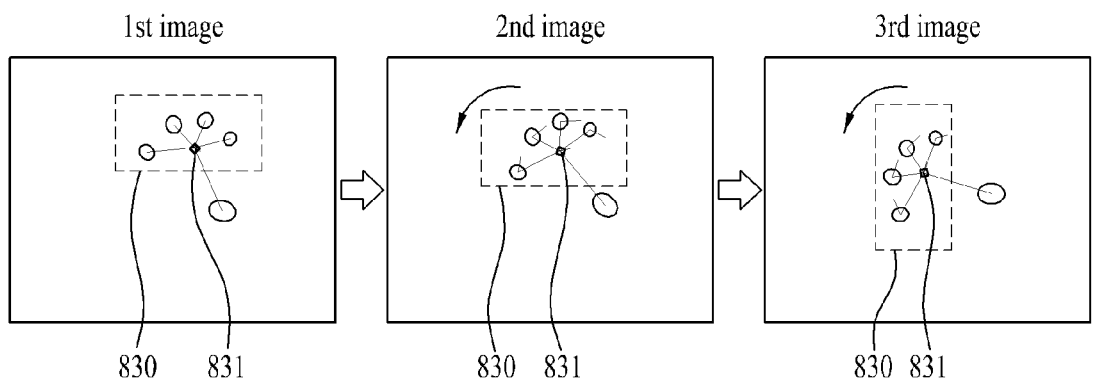
(b)

FIG. 8H
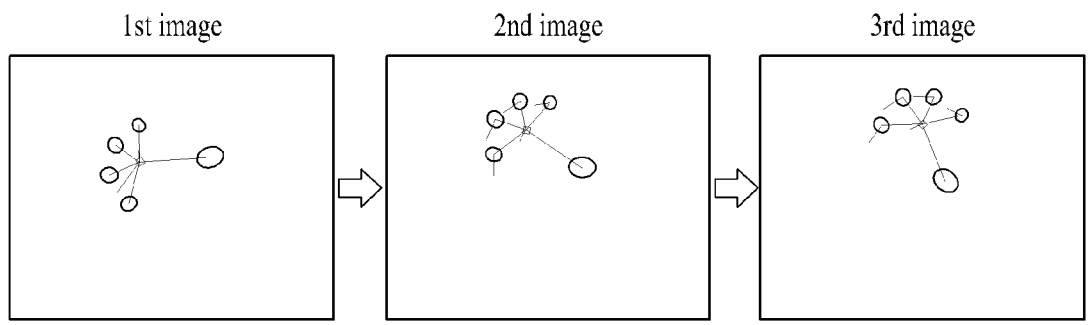
FIG. 8I
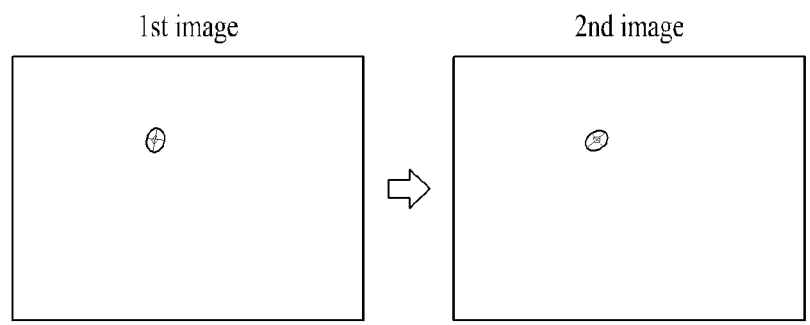

MOBILE TERMINAL AND TOUCH RECOGNIZING METHOD THEREIN

CROSS-REFERENCE TO RELATED APPLICATIONS

Pursuant to 35 U.S.C. §119(a), this application claims the benefit of earlier filing date and right of priority to Korean Application No. 10-2010-0137503, filed on Dec. 29, 2010, the contents of which are hereby incorporated by reference herein in their entirety.

BACKGROUND OF THE INVENTION

1. Field of the Invention

The present invention relates to a mobile terminal, and more particularly, to a mobile terminal and touch recognizing method therein. Although the present invention is suitable for a wide scope of applications, it is particularly suitable for recognizing a multi-touch.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Touch gesture interfaces have been developed into a multi-touch for touching with two or more pointers from a single touch for touching with a single pointer.

Recently, as a multi-touch interface of a multi-touch all-point type free from the number of touch points has appeared, the demand for recognition of a multi-touch of the multi-touch all-point type and a corresponding gesture definition is rising.

SUMMARY OF THE INVENTION

Accordingly, the present invention is directed to a mobile terminal and touch recognizing method therein that substantially obviate one or more problems due to limitations and disadvantages of the related art.

An object of the present invention is to provide a mobile terminal and touch recognizing method therein, by which gestures of various types can be recognized in consideration of a touch pattern and a change of the touch pattern.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen receiving a plurality of touches simultaneously, a camera provided under the touchscreen, the camera consecutively receiving a plurality of images including a plurality of the received touches for a predetermined time, and a controller determining patterns and pattern changes of a plurality of the touches included in a plurality of the images, respectively, the controller recognizing a gesture by a plurality of the touches in accordance with a result of the determination.

In another aspect of the present invention, a method of recognizing a touch in a mobile terminal includes the steps of receiving a plurality of touches simultaneously using a touchscreen, consecutively receiving a plurality of images including a plurality of the received touches for a predetermined time using a camera provided under the touchscreen, determining patterns and pattern changes of a plurality of the touches included in a plurality of the images, respectively, and recognizing a gesture by a plurality of the touches in accordance with a result of the determining step, wherein the touch pattern comprises at least one selected from the group consisting of a touch number, a touch point, a touch size and a touch figure.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram of an image resulting from pre-processing a touch contained image inputted via a camera according to the present invention;

FIGS. 5A to 5D are diagram of gesture types according to the present invention;

FIGS. 8A to 8I are diagrams for a gesture recognizing process using a plurality of images according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
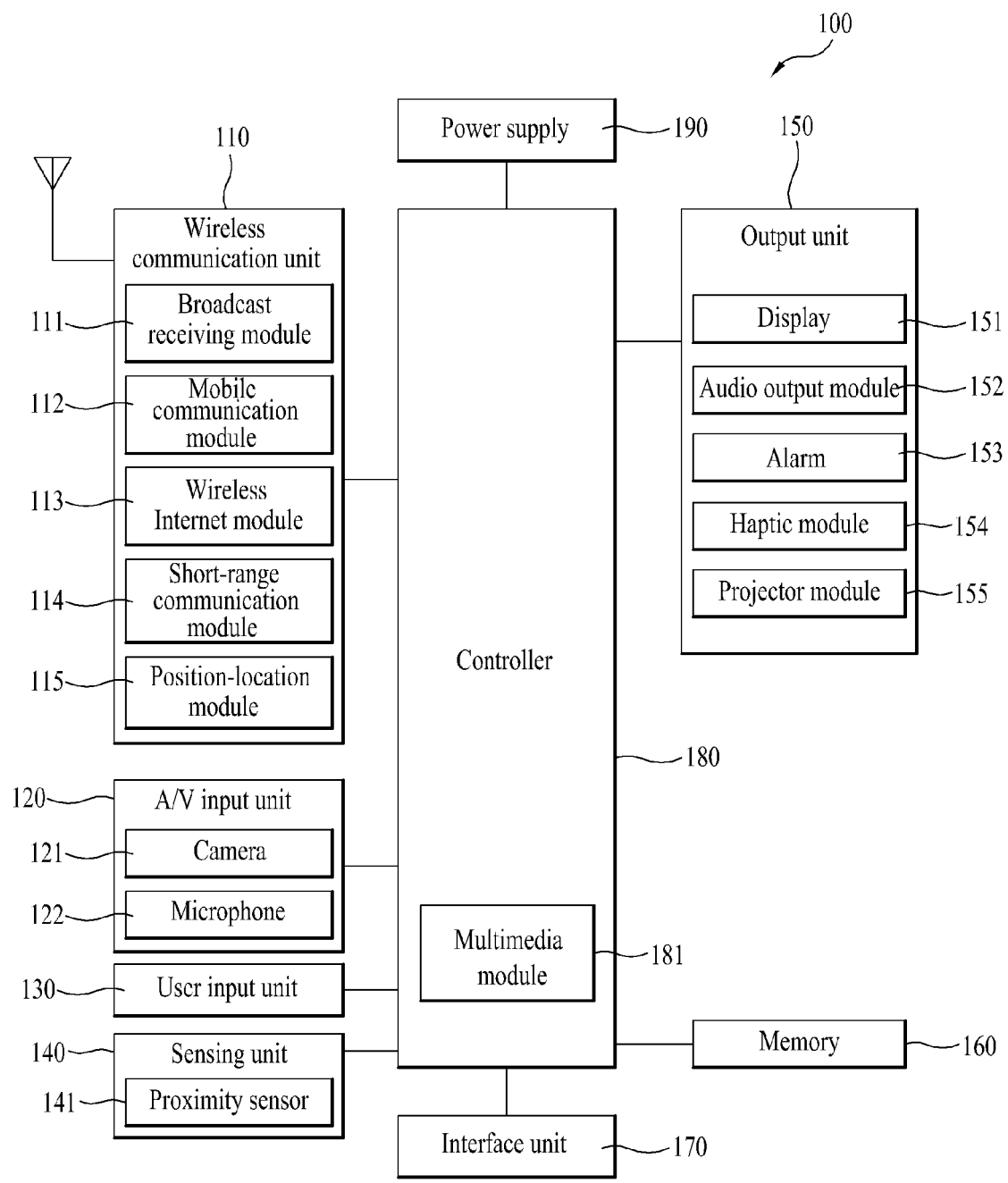
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Interconnected operational mechanism between the display unit 151 and the touchpad (not shown) is explained with reference to FIG. 2 as follows.

Figure 2:
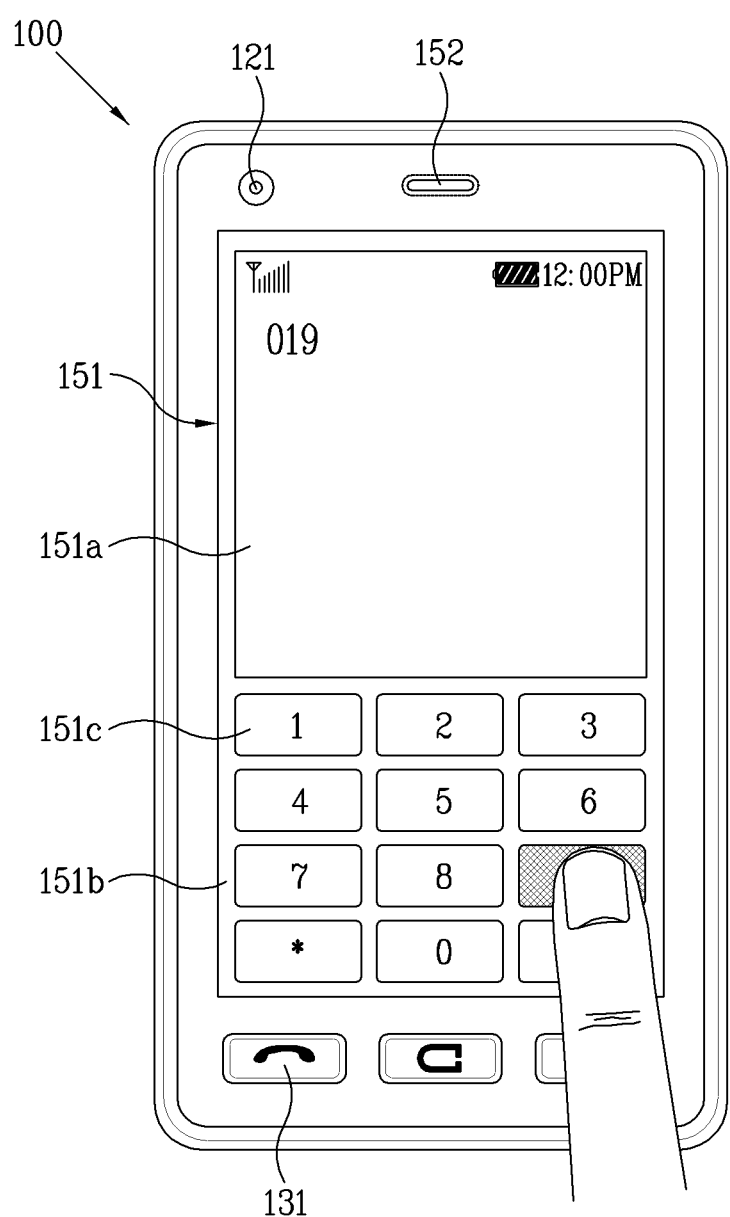
FIG. 2 is front diagram of a mobile terminal according to one embodiment of the present invention for explaining one operational status of the mobile terminal.

FIG. 2 is front-view diagram of a terminal according to one embodiment of the present invention for explaining an operational state thereof.

First of all, various kinds of visual information can be displayed on the display unit 151. And, theses information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 2 shows that a touch applied to a soft key is inputted through a front face of a terminal body.

The display unit 151 is operable through an entire area or by being divided into a plurality of regions. In the latter case, a plurality of the regions can be configured interoperable.

For instance, an output window 151a and an input window 151b are displayed on the display unit 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection for the phone number displayed on the output window 151a is attempted.

A mobile terminal mentioned in the present specification can include at least one of the components shown in FIG. 1 and can include new components except the former components shown in FIG. 1 occasionally.

A touchscreen mentioned in the present specification can configure an interface capable of receiving an input of a single touch via a single pointer and an input of a multi-touch via each of at least two pointers. For instance, the multi-touch can include a multi-touch having two touch points and a multi-touch (i.e., a multi-touch all-point scheme) having no limitation put on the number of touch points. The touchscreen is one example of the display unit and can be indicated by the same reference number 151 of the display unit.

Specifically, the present invention relates to a touch recognizing method by a multi-touch all-point scheme. In this case, the multi-touch all-point scheme obtains touch information on all touch pointes touched on the touchscreen, and particularly, is able to obtain touch information of raw level by subdividing all touch points.

In the following description, a method of recognizing a touch according to the present invention is explained in detail with reference to the accompanying drawings.

Figure 3:
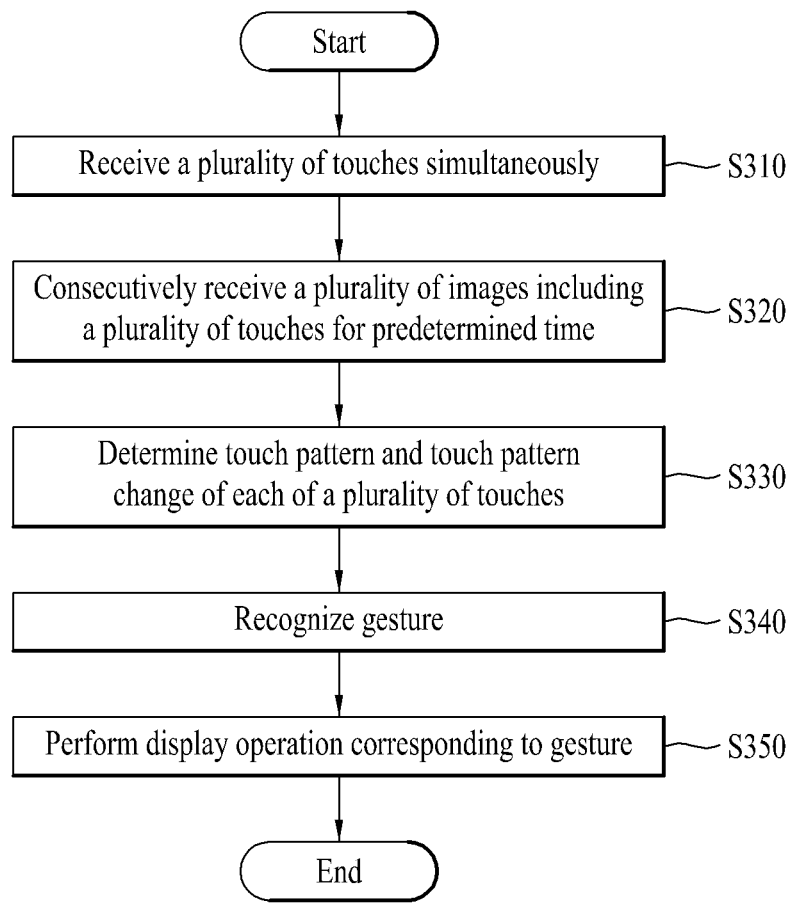
FIG. 3 is a first flowchart for a method of recognizing a touch in a mobile terminal according to one embodiment of the present invention.

FIG. 3 is a first flowchart for a method of recognizing a touch in a mobile terminal according to one embodiment of the present invention.

Referring to FIG. 3, the mobile terminal 100 simultaneously receives an input of a plurality of touches using the touchscreen 151 [S310].

In this case, in order to receive the input of a plurality of the touches simultaneously, a plurality of the touches can be inputted using a plurality of pointers (e.g., fingers, stylus pens, etc.), respectively.

For instance, a plurality of the touches include at least two touches to the same point, at least two touches shifted in the same direction, at least two touches shifted in a $1^{st}$ direction & at least two touches shifted in a $2^{nd}$ direction (opposite to the $1^{st}$ direction), at least two touches shifted to merge into one point, at least two touches separately shifted from one point and the like.

The touchscreen 151 can be provided with an interface configured to receive an input of a plurality of touches, and more particularly, with an interface suitable for multi-touch all-point.

Operating principle of the touchscreen 151 is described in detail with reference to one example as follows.

First of all, the touchscreen 151 is able to sense a multi-touch using FTIR (Fourier transform infrared) technique. The FTIR technique is configured to encourage total reflection using an infrared illumination below. If there is no touch, the illumination light moves within a screen surface. If there is a touch, the illumination light is dispersed. And, the dispersed light can be inputted to an infrared camera.

The mobile terminal 100 consecutively receives inputs of a plurality of images containing a plurality of the inputted touches for a predetermined period of time using a camera (not shown in the drawing) [S320].

In this case, the camera is a separately provided camera different from the camera 121 provided for external image photographing or the camera 121' provided under the touchscreen 151 for self-photographing and can be provided to receive an input of an image containing a touch to the touchscreen 151. For instance, the camera can include an infrared camera.

Each of a plurality of the images can contain all of a plurality of the inputted touches. The predetermined period of time or the number of the inputted images is automatically set or can be set in accordance with a user selection.

The mobile terminal 100 determines a touch pattern and a touch pattern change of each of a plurality of the touches, which are contained in each of a plurality of the images, for each of a plurality of the images under the control of the controller 180 [S330].

The mobile terminal 100 is able to pre-process (or image-process) each of a plurality of the inputted images before the determining step S330. This is to exactly determine a touch point (or a touch zone) by each of a plurality of the touches.

In particular, the mobile terminal 100 is able to pre-process each of a plurality of images inputted via camera (particularly, infrared camera) by such an image processing scheme as morphology, smoothing and the like for background removal, noise removal and the like. For instance, FIG. 4 is a diagram of an image (b) resulting from pre-processing an inputted image (a) containing a plurality of touches 401 to 405.

In the determining step S330, the mobile terminal 100 determines a touch pattern corresponding to each of a plurality of the images and is then able to determine a touch pattern change using touch patterns of previous and next images among a plurality of the images.

In the determining step S330, the mobile terminal 100 determines at least one of a touch number, a touch point, a touch size, a touch figure and the like as the touch pattern and is able to determine at least one of a touch number change, a touch point change, a touch size change and a touch figure change as the touch pattern change.

Moreover, in the determining step S330, the mobile terminal 100 is able to determine a shift distance, a shift direction, a spaced distance (from another touch) and the like of each of a plurality of the inputted touches based on the touch point change.

In the determining step S330, the mobile terminal 100 is able to perform labeling for extracting the number, size and figure of the touch points by a plurality of the touches. In this case, if pixels of an image including a plurality of touches consist of one blob, it is able to individualize each blob or a touch point corresponding to each blob number by numbering each block. And, it is able to estimate a shift path and direction by tracking the individualized touch points.

In the determining step S330, if a touch point is shifted over a predetermined distance, the mobile terminal 100 is able to recognize a direction change of the touch point. In particular, the mobile terminal 100 is able to recognize a touch shift each time the touch point is shifted over predetermined pixels between images.

In the determining step S330, under the control of the controller 180, the mobile terminal 100 generates at least one touch group including at least two touches having the determined shift direction identical/similar to each other and is then able to recognize the at least two touches belonging to the generated touch group as a representative touch.

For instance, as the representatively touch, the controller 180 recognizes a touch to a weight center of the at least two touch, a random one of the at least two touches, a touch having a big or small touch pattern change among the at least two touches, or a touch to an intermediate point of the at least two touches.

The mobile terminal recognizes a gesture by a plurality of the inputted touches in accordance with the result of the determination in the determining step S330, under the control of the controller 180 [S340].

The mobile terminal 100 is able to store information on a gesture corresponding to a touch pattern and a touch pattern change in the memory 160. For instance, a gesture per touch pattern/touch pattern change can be stored as a table. Hence, the controller 180 is able to recognize the gesture corresponding to the touch pattern and the touch pattern change of the inputted touch using the stored information.

In the recognizing step S340, the mobile terminal 100 is able to recognize at least one of a shift gesture and a scroll gesture to corresponding to a shift distance (hereinafter named a representative shift distance) of the aforesaid representative touch and a shift direction (hereinafter named a representative shift direction) of the representative touch.

In the recognizing step S340, if the generated touch group includes a $1^{st}$ touch group and a $2^{nd}$ touch group, the mobile terminal 100 recognizes a space distance (hereinafter named a representative space distance) between a $1^{st}$ representative touch corresponding to the $1^{st}$ touch group and a $2^{nd}$ representative touch corresponding to the $2^{nd}$ touch group. If the determined space distance increases, the mobile terminal 100 recognizes an enlarging gesture. If the determined space distance decreases, the mobile terminal 100 recognizes a reducing gesture.

In the following description, the gesture recognition is explained in detail with reference to FIGS. 5A to 5D. For clarity and convenience of the following description, assume that a pointer is limited to a user finger.

FIGS. 5A to 5D are diagram of gesture types according to the present invention,

Referring to FIG. 5A, in case of receiving an input of a tapping action with one finger by being pressed with another finger or an input of an action of tapping with two fingers simultaneously [511], the mobile terminal 100 is able to recognize a click gesture [510]. In case of receiving an input of a tapping action with one finger twice by being pressed with another finger [521] or an input of an action of tapping twice with two fingers simultaneously [522], the mobile terminal 100 is able to recognize a double click gesture 520.

Referring to FIG. 5B, in case that a plurality of fingers are shifted in the same direction [531 or 532], the mobile terminal 100 is able to recognize a shift gesture or a scroll gesture [530]. In particular, the mobile terminal 100 is able to recognize a shift or scroll gesture corresponding to a shift direction and distance of a plurality of fingers.

Moreover, the mobile terminal 100 generates a touch group including a plurality of touches by a plurality of fingers and is then able to recognize a shift or scroll gesture corresponding to a shift direction and distance of a representative touch of the generated touch group.

In case of receiving an input of an action of flicking a plurality of fingers at high speed in the same direction [541, 542], the mobile terminal 100 is able to recognize a shift gesture or a flicking gesture. In particular, the mobile terminal 100 is able to recognize a shift or flicking gesture corresponding to a shift direction and speed of a plurality of fingers.

Moreover, the mobile terminal 100 generates a touch group including a plurality of touches by a plurality of fingers and is then able to recognize a shift or flicking gesture corresponding to a shift direction and speed of a representative touch of the generated touch group.

Referring to FIG. 5C, in case of receiving an input of a drag action of a plurality of $1^{st}$ fingers shifted in a $1^{st}$ direction and a drag action of a plurality of $2^{nd}$ fingers shifted in a direction opposite to the first direction (i.e., a distance between a plurality of the $1^{st}$ fingers and a plurality of the $2^{nd}$ fingers increases) [551], an input of a drag action of a plurality of fingers shifted in a direction getting away from one point [552], or an input of an outward rotating action of two touched fingers (i.e., a change of a touch figure) [553], the mobile terminal 100 is able to recognize an enlarging gesture.

In case of receiving an input of a drag action of a plurality of $1^{st}$ fingers shifted in a $1^{st}$ direction and a drag action of a plurality of $2^{nd}$ fingers shifted in a direction opposite to the first direction (i.e., a distance between a plurality of the $1^{st}$ fingers and a plurality of the $2^{nd}$ fingers decreases) [561], an input of a drag action of a plurality of fingers shifted in a direction merging into one point [562], or an input of an inward rotating action of two touched fingers (i.e., a change of a touch figure) [563], the mobile terminal 100 is able to recognize a reducing gesture.

In particular, the mobile terminal 100 is able to recognize an enlarging/reducing gesture having an enlarging/reducing extent proportional to a shift distance or a space distance. And, the mobile terminal 100 is able to recognize an enlarging/reducing gesture having an enlarging/reducing extent proportional to an angle variation by a rotating action.

Furthermore, the mobile terminal 100 is able to generate a $1^{st}$ touch group corresponding to a plurality of $1^{st}$ fingers and a $2^{nd}$ touch group corresponding to a plurality of $2^{nd}$ fingers. Hence, the mobile terminal 100 is able to recognize an enlarging/reducing gesture having an enlarging/reducing extent proportional to a representative shift distance, a representative space distance or a representative angle variation of each of $1^{st}$ and $2^{nd}$ representative touches of the $1^{st}$ and $2^{nd}$ touch groups.

Referring to FIG. 5D, in case of receiving an input of an action of drawing a circle with at least two fingers [571 or 572], the mobile terminal 100 is able to recognize a rotating gesture. Alternatively, while the mobile terminal 100 is touched with at least two fingers, when at least one of the at least two fingers are held still, in case of receiving an input of an action of dragging a circle with the rest of the at least two fingers 5[73], the mobile terminal 100 is able to recognize a rotating gesture as well. In particular, the mobile terminal 100 is able to recognize a rotating gesture in a rotating direction of the circle drawing action and is also able to recognize a rotating gesture having a rotating angle amounting to an angle variation of the circle drawing action.

Of course, the gestures are non-limited by the above-mentioned examples. And, more gestures of various types by a plurality of simultaneously inputted touches can be included.

In the following description, a touch recognizing method according to detailed embodiments for a touch pattern and a touch pattern change is explained in detail with reference to the accompanying drawings.

Figure 6:
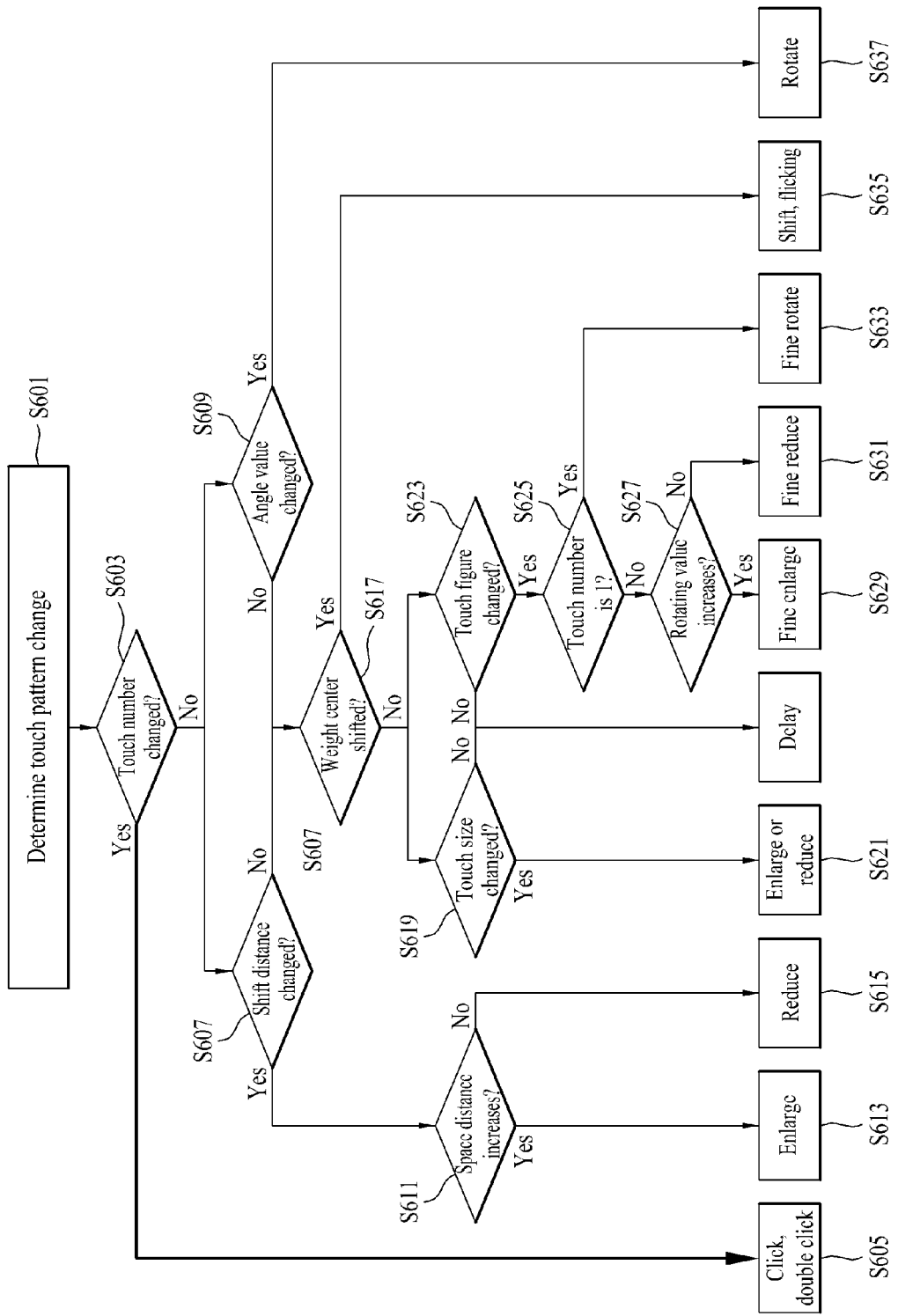
FIG. 6 is a second flowchart for a method of recognizing a touch in a mobile terminal according to one embodiment of the present invention.

FIG. 6 is a second flowchart for a method of recognizing a touch in a mobile terminal according to one embodiment of the present invention.

Referring to FIG. 6, under the control of the controller 180, the mobile terminal 100 determines a touch pattern and a touch pattern change of each of a plurality of touches included in each of a plurality of images [S601]. As the determining step S601 is identical to the former determining step S330 shown in FIG. 3, it is able to refer to the description of the former determining step S330.

The mobile terminal determines a change of the touch number under the control of the controller 180 [S603]. A presence or non-presence of the change of the touch number can be determined using a touch number change information in each of a plurality of observation target images.

In case of determining that the touch number has been changed, the mobile terminal 100 is able to recognize a click gesture or a double click gesture under the control of the controller 180 [S605]. For instance, a click gesture or a double click gesture, which corresponds to a touch number change, can be recognized through a tapping-once action or a tapping-twice action [511 or 521 in FIG. 5A] by one finger while the other is held still.

In case of determining that the touch number is not changed, under the control of the controller 180, the mobile terminal 100 determines a presence or non-presence of a shift distance change [S607] or is able to determine a presence or non-presence of an angle value change [S609].

In particular, the mobile terminal finds a weight center point of a plurality of touch points by a plurality of touches, calculates an average shift distance from the weight center point to a plurality of the touch points, and is able to calculate an angle value and an average angle value of each of a plurality of the touch points with reference to the weight center point.

The controller 180 is able to calculate a coordinate value of a weight center point using Formula 1.

$$\overline{D_t} = \frac{1}{N}\left\{\sum_{i=1}^{N}\sqrt{[C(x) - ID_t^i(x)]^2 + [C(y) - ID_t^i(y)]^2}\right\}$$ [Formula 1]

Figure 7A:
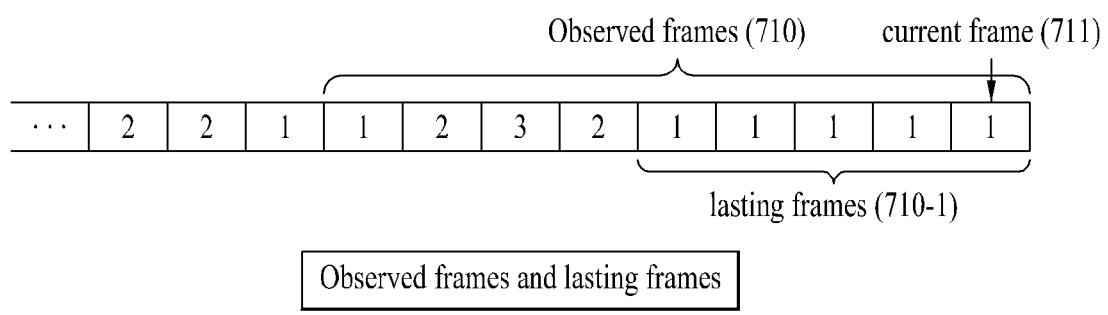
FIG. 7A and FIG. 7B are diagrams for a shift distance and angle value change

N: Number of touch points
$ID_t^i(x, y)$: Touch coordinates
C: Coordinate value of weight center point First of all, the step S607 of determining a presence or non-presence of the shift distance change is described as follows. For clarity and convenience of the following description, referring to FIG. 7A, assume that a touch lasting image (or frames) 710-1, in which a current frame 711 is included, is included in an observation target image (or frames) 710.

The controller 180 is able to calculate a distance average value between a weight center point and all touch points using Formula 2.

$$C = (C(x), C(y)) = \frac{1}{N}\left\{\sum_{i=1}^{N} ID_t^i(x), \sum_{i=1}^{N} ID_t^i(y)\right\}$$ [Formula 2]

$ID_t^i(x, y)$: Touch coordinates

The controller 180 is able to calculate an average shift distance of a plurality of touches for the touch lasting images by substituting the value calculated by Formula 2 for Formula 3.

$$\overline{\overline{D}} = \frac{1}{N_k - 1}\sum_{t=(N_t-N_k)+1}^{N_t}(\overline{D_t} - \overline{D_{t-1}})$$ [Formula 3]

Nt: Number of observation target images
Nk: Number of touch lasting images

In case of determining that the average shift distance of a plurality of the touches has been changed as a result of the determination, under the control of the controller 180, the mobile terminal 100 determines whether a space distance between a plurality of the $1^{st}$ touches and a plurality of the $2^{nd}$ touches, which differ from each other in a shift direction, increase or not [S611]. For instance, a plurality of the $1^{st}$ touches are shifted in a right direction, while a plurality of the $2^{nd}$ touches are shifted in a left direction.

If the space distance increases as a result of the determination [Yes], under the control of the controller 180, the mobile terminal 100 recognizes an enlarging gesture [S613]. If the space distance decreases as a result of the determination [No], under the control of the controller 180, the mobile terminal 100 recognizes a reducing gesture [S615]. Moreover, if the space distance does not change as a result of the determination [No, corresponding to a case that the shift directions are equal to each other], the mobile terminal 100 is able to recognize a shift or scroll gesture amounting to an average shift distance in the shift direction.

In particular, the mobile terminal 100 recognizes the enlarging gesture having an enlarging extent proportional to an increasing extent of the space distance in the step S613 and is able to recognize the reducing gesture having a reducing extent proportional to a decreasing extent of the space distance in the step S615.

In the following description, the step S609 of determining a presence or non-presence of an angle value change is explained.

First of all, the controller 180 is able to calculate an angle value between the weight center point and each touch point using Formula 4.

Figure 7B:
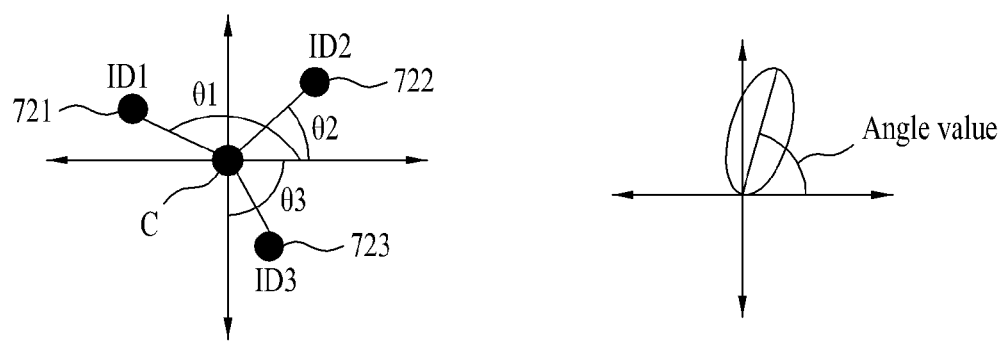

For instance, referring to FIG. 7B (a), there exist $1^{st}$ to $3^{rd}$ touch points ID_1_721, ID2_722 and ID3_723 corresponding to $1^{st}$ to $3^{rd}$ touches, respectively. And, it can be observed that angle values of the $1^{st}$ to $3^{rd}$ touch points ID_1_721, ID2_722 and ID3_723 are θ1, θ2 and θ3 centering on the weight center C_720, respectively. Moreover, referring to FIG. 7B (b), a figure of the touch point is shown. In this case, the figure of the touch point can be represented as a slope of a long axis on an orthogonal coordinate system. And, a size of the touch point can be represented as the number of touch pixels.

$$ID_t^i(\theta) = a\tan\left[\frac{C(y) - ID_t^i(y)}{C(x) - ID_t^i(x)}\right] \quad \text{[Formula 4]}$$

The controller 180 is able to calculate an angle change value of every touch point for touch lasting images by substituting the value calculated by Formula 4 for Formula 5.

$$\overline{ID(\theta)} = \frac{1}{N}\sum_{i=1}^{N}\overrightarrow{ID^i}(\theta) \quad \text{[Formula 5]}$$

Moreover, the controller 180 is able to calculate an average value of angle change values of all touch points for the touch lasting images by substituting the value calculated by Formula 5 for Formula 6.

$$\overrightarrow{ID^i(\theta)} = \frac{1}{N_k - 1}\sum_{t=(N_t-N_k)+1}^{N_t}(ID_t^i(\theta) - ID_{t-1}^i(\theta)) \quad \text{[Formula 6]}$$

Furthermore, the controller 180 is able to calculate a size and figure change value of each touch point for the touch lasting images and average values thereof. And, the controller 180 is able to obtain a shift path of the weight center point (by Formula 1).

As a result of the determination in the step S609, if the mobile terminal 100 determines that the average value of all angle change values of a plurality of the touches is changed [Yes], the mobile terminal 100 is able to recognize a rotating gesture under the control of the controller 180 [S637].

In particular, in the step S637, the mobile terminal 100 is able to recognize the rotating gesture having a rotating extent proportional to an average value of the angle change values.

Meanwhile, if the mobile terminal 100 determines that the average shift distance/average angle value of all touches (or touch points) is not changed as a result of the determination in the step S607/S609 [No], the mobile terminal 100 determines a presence or non-presence of a shift of the weight center shift [S617].

In doing so, the controller 180 is able to determine whether the weight point has been shifted in a manner of calculating coordinates of the weight center point in previous and next images among the touch lasting images (using Formula 1).

As a result of the determination in the step S617, if it is determined that the weight center point has been shifted, under the control of the controller 180, the mobile terminal 100 is able to recognize a shift gesture or a flicking gesture [S635].

In particular, the mobile terminal 100 is able to recognize a shift gesture having a shift distance proportional to a shift extent of the weight center point or a flicking gesture having a flicking speed proportional to the shift extent of the weight center point in the step S635.

As a result of the determination in the step S617, if it is determined that the weight center point has not been shifted [No], under the control of the controller 180, the mobile terminal 100 determines a presence or non-presence of a touch size change [S619] or a presence or non-presence of a touch figure change [S623].

As a result of the determination in the step S619, in case of determining that the touch size has been changed [Yes], under the control of the controller 180, the mobile terminal 100 is able to recognize an enlarging gesture if the touch size increases [S621]. On the contrary, the mobile terminal 100 is able to recognize a reducing gesture if the touch size decreases [S621]. Besides, in case of determining that the touch size has not been changed as a result of the determination in the step S619 [No], the mobile terminal 100 is able to recognize a delay of the touch action.

In particular, in the step S621, the mobile terminal 100 recognizes an enlarging gesture having an enlarging extent proportional to an increasing extent of the touch size or a reducing gesture having a reducing extent proportional to a decreasing extent of the touch size.

As a result of the determination in the step S623, in case of determining that the touch figure has been changed [Yes], under the control of the controller 180, the mobile terminal 10 determines whether the number of touch(s) is 1 [S625]. On the contrary, in case of determining that the touch figure has not been changed as a result of the determination in the step S623 [No], the mobile terminal 100 is able to recognize a delay of the touch action.

In case of determining that the touch number is one as a result of the determining step S625 [Yes], under the control of the controller 180, the mobile terminal 100 is able to recognize a rotating gesture [S633]. In particular, the rotating gesture recognized in the step S633 can have a rotating extent smaller than that of the former rotating gesture recognized in the step S637.

Meanwhile, in case of determining that the touch number is not one as a result of the determining step S625, under the control of the controller 180, the mobile terminal 100 is able to determine a presence or non-presence of an increase of a rotating value [S627].

In case of determining that the rotating value has increased as a result of the determining step S627 [Yes], under the control of the controller 180, the mobile terminal 100 recognizes an enlarging gesture [S629]. On the contrary, in case of determining that the rotating value has decreased [No], the mobile terminal 100 is able to recognize a reducing gesture [S631].

In this case, the enlarging gesture in the step S629 can have an enlarging extent smaller than that of the former enlarging gesture in the step S613. And, the reducing gesture in the step S631 can have a reducing extent smaller than that of the former reducing gesture in the step S615.

In the step S629, the mobile terminal 100 s able to recognize the enlarging/reducing gesture having an enlarging/reducing extent proportional to an increasing/decreasing extent of the rotating value.

In the following description, a gesture recognizing process using a plurality of images is explained in detail with reference to FIGS. 8A to 8I.

FIGS. 8A to 8I are diagrams for a gesture recognizing process using a plurality of images according to the present invention.

For clarity and convenience of the following description, assume that $1^{st}$ to $3^{rd}$ images mentioned in the following configure a touch lasting image and are inputted in sequence.

Figure 8A:
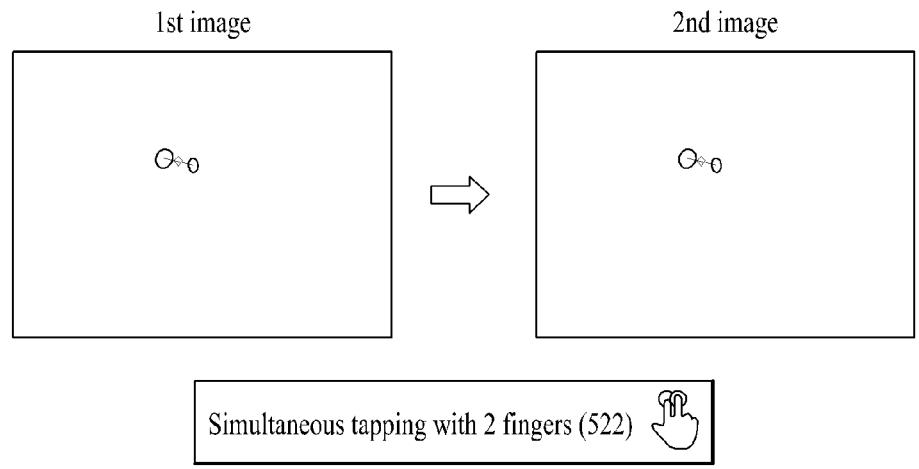

Referring to FIG. 8A, if it is checked that $1^{st}$ and $2^{nd}$ images are simultaneously tapped with two fingers, respectively, the mobile terminal 100 is able to recognize a double click gesture (cf. 522 in FIG. 5A).

Figure 8B:
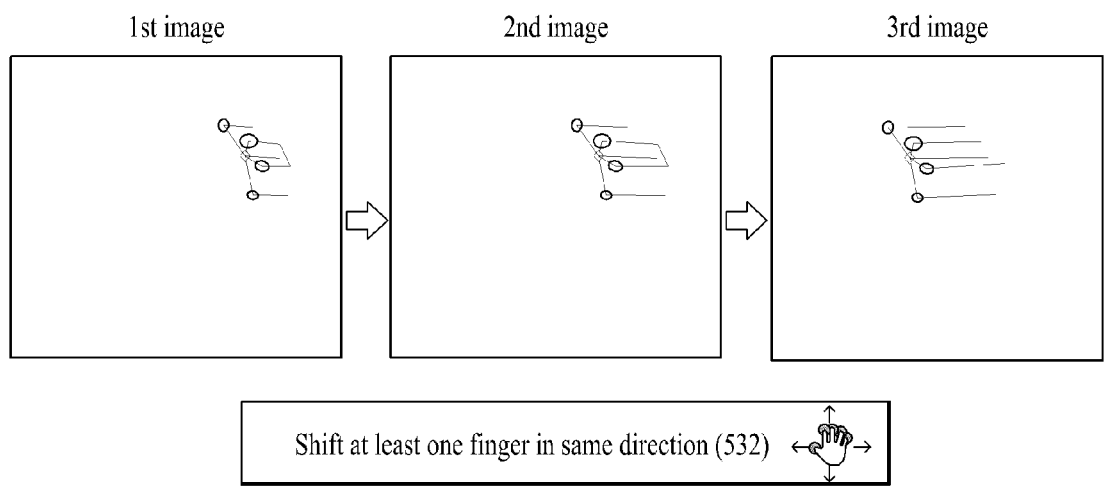

Referring to FIG. 8B, it is checked that a plurality of fingers are shifted on each of $1^{st}$ and $2^{nd}$ images in a right direction. And, it is also checked that positions of the touch points are gradually shifted on a result image to the right from the $1^{st}$ image toward the $2^{nd}$ image. Hence, the mobile terminal 100 is able to recognize a shift gesture in a right direction (cf. 532 in FIG. 5B).

Referring to FIG. 8C (a), in case that a space distance between a plurality of $1^{st}$ touches (situated on a left part) and a plurality of $2^{nd}$ touches (situated on a right part) on each of $1^{st}$ to $3^{rd}$ images is gradually increasing, the mobile terminal 100 is able to recognize an enlarging gesture (cf. 551 in FIG. 5C).

Referring to FIG. 8C (b), the mobile terminal 100 generates a $1^{st}$ touch group 810 including a plurality of $1^{st}$ touches and a $2^{nd}$ touch group 820 including a plurality of $2^{nd}$ touches and is then able to recognize a weight center of a plurality of the $1^{st}$ touches and a weight center of a plurality of the $2^{nd}$ touches as a $1^{st}$ representative touch 811 of the $1^{st}$ touch group 810 and a $2^{nd}$ representative touch 821 of the $2^{nd}$ touch group 820, respectively. And, if a space distance between the $1^{st}$ representative touch 811 and the $2^{nd}$ representative touch 821 increases in the $1^{st}$ to $3^{rd}$ images, the mobile terminal 100 is able to recognize an enlarging gesture.

Figure 8F:
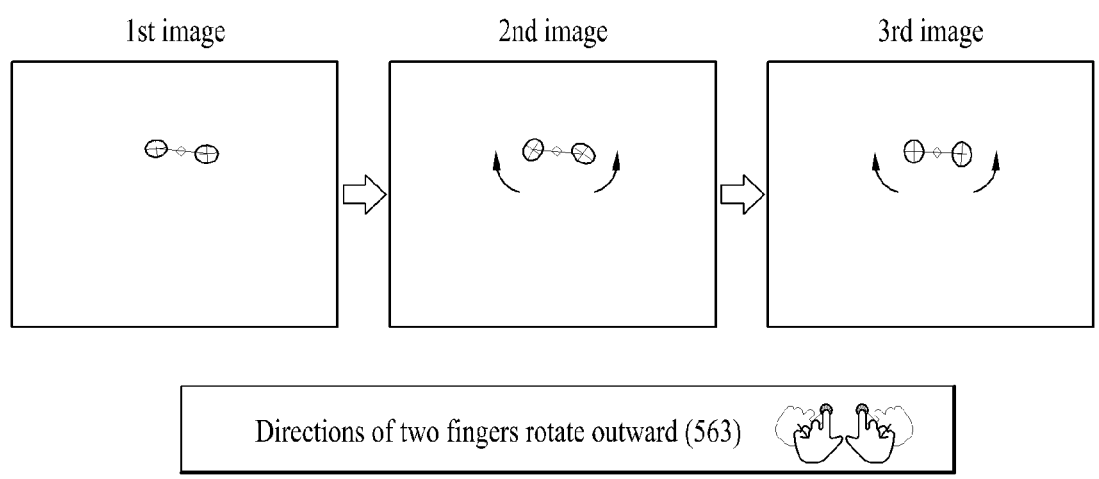

Referring to FIG. 8D or FIG. 8F, while the $1^{st}$ to $3^{rd}$ images are touched with two fingers, if the two fingers are rotated outward, the mobile terminal 100 is able to recognize a rotating gesture (cf. 553 or 563 in FIG. 5C) rotating from inside to outside (i.e., outward).

Referring to FIG. 8E, in case that a plurality of fingers are gradually gathering together centering on a random point in the $1^{st}$ to $3^{rd}$ images (e.g., a touch action as if making a fist), the mobile terminal 100 is able to recognize a reducing gesture (cf. 562 in FIG. 5C).

Referring to FIG. 8G (a), in case of receiving an input of an action that a plurality of fingers are rotated counterclockwise in the $1^{st}$ to $3^{rd}$ images, the mobile terminal 100 is able to recognize a rotating gesture rotating counterclockwise (e.g., a rotating action 571-1 in a direction opposite to that of the action 571 in FIG. 5D).

Referring to FIG. 8G (b), the mobile terminal 100 generates a touch group 830 including a plurality of touches rotating in the $1^{st}$ to $3^{rd}$ images and is then able to recognize a weight center of a plurality of the touches as a representative touch 831 of the touch group 830. Subsequently, if the representative touch 831 is gradually rotating in the $1^{st}$ to $3^{rd}$ images counterclockwise, the mobile terminal 100 is able to recognize a rotating gesture.

Referring to FIG. 8H, in case of receiving an input of an action that a plurality of fingers rotate clockwise in the $1^{st}$ to $3^{rd}$ images, the mobile terminal 100 is able to recognize a rotating gesture rotating clockwise (e.g., a rotation action 571-2 in the same direction of the former action 571 shown in FIG. 5D).

Referring to FIG. 8I, in case that a touched finer is rotating clockwise in the $1^{st}$ and $2^{nd}$ images, the mobile terminal 100 is able to recognize a rotating gesture (e.g., rotating in a direction opposite to the former gesture 574 shown in FIG. 5D).

According to the present invention, under the control of the controller 180, the mobile terminal 100 is able to perform a display controlling operation corresponding to the recognized gesture.

For instance, in case of recognizing a click gesture or a double click gesture, the mobile terminal 100 is able to perform a selecting operation, an executing operation, a detail displaying operation, a zoom-in display operation and the like of information displayed at the click or double click gesture inputted point.

In case of recognizing an enlarging/reducing gesture, the mobile terminal 100 is able to perform an enlarging/reducing display of a currently displayed information. And, the mobile terminal 100 is able to perform an enlarging/reducing display on an enlarging/reducing gesture inputted partial information in the whole information currently displayed only.

In case of recognizing a rotating gesture, the mobile terminal 100 is able to perform a rotating display of a currently displayed information. And, the mobile terminal 100 is able to perform a rotating display on a rotating gesture inputted partial information in the whole information currently displayed only.

In case of recognizing a shift gesture (or a flicking gesture), the mobile terminal 100 scrolls a screen or can be shifted to a next screen. In proportion to a shift speed or distance of the shift gesture, a scroll extent or speed is determined or the mobile terminal 100 can be shifted to a screen having a farther situated order.

According to one embodiment of the present invention, the above-described touch recognizing methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Accordingly, the present invention provides the following effects and/or advantages.

First of all, as the present invention puts no limitation on the number of inputtable touches, a user is able to input a desired number of touches irrespective of a display size and needs not to learn the number of touches in advance.

Secondly, the present invention recognizes various gestures in accordance with a touch pattern and a touch pattern change, thereby enabling a user to input various gestures.

Thirdly, the present invention enables various gestures to be inputted, thereby performing various display controlling operations in accordance with the gestures.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a touchscreen configured to simultaneously receive a plurality of touches and to display information;
a camera provided under the touchscreen, the camera configured to capture a plurality of images of the plurality of received touches; and
a controller configured to:
detect the plurality of touches from the plurality of captured images;
detect a first touch scheme, a second touch scheme, a third touch scheme, and a fourth touch scheme from the plurality of touches, the first touch scheme and the second touch scheme each comprising at least two touches;
determine patterns and pattern changes of a first intermediate point of the at least two touches of the first touch scheme and a second intermediate point of the at least two touches of the second touch scheme;
recognize a gesture pattern of the plurality of touches based on the patterns and pattern changes of the first intermediate point and the second intermediate point;

recognize the third touch scheme as an enlarging gesture, wherein the third touch scheme comprises a first touch and a second touch of the plurality of touches, the second touch located to a right side of the first touch, and wherein the first touch is rotated clockwise while the second touch is rotated counter-clockwise at a same time, each of the first and second touches rotated while maintaining a same respective touch location;

cause enlargement of the displayed information based on the recognized third touch scheme;

recognize the fourth touch scheme as a reducing gesture, wherein the fourth touch scheme comprises a third touch and a fourth touch of the plurality of touches, the third and fourth touches simultaneously received via the touchscreen, and the fourth touch located to a right side of the third touch, and wherein the third touch is rotated counter-clockwise while the fourth touch is rotated clockwise at a same time, each of the third and fourth touches rotated while maintaining a same respective touch location; and cause reduction of the displayed information based on the recognized fourth touch scheme.

2. The mobile terminal of claim 1, wherein the controller is further configured to recognize the gesture pattern by detecting at least a number of touches, a position of at least one touch, a size of at least one touch, or a shape of at least one touch.

3. The mobile terminal of claim 1, wherein the controller is further configured to recognize the gesture pattern by detecting at least a moved distance, a moved direction, or a change in distance from a particular point of each of the plurality of touches.

4. The mobile terminal of claim 3, wherein the controller is further configured to detect:

a reducing gesture pattern when the moved direction of each of two or more of the plurality of touches is a direction converging toward a particular point; and an enlarging gesture pattern when the moved direction of each of two or more of the plurality of touches is a direction expanding away from a particular point.

5. The mobile terminal of claim 3, wherein the controller is further configured to:

group at least two touches of the plurality of touches, wherein the moved direction of each of the at least two touches comprises a same direction; and generate a representative touch of the grouped at least two touches.

6. The mobile terminal of claim 5, wherein the controller is further configured to detect at least a shift gesture pattern or a scroll gesture pattern in response to a moved distance or a moved direction of the representative touch.

7. The mobile terminal of claim 2, wherein the controller is further configured to:

recognize an enlarging gesture pattern when the size of each of the plurality of touches increases; and recognize a reducing gesture pattern when the size of each of the plurality of touches decreases.

8. The mobile terminal of claim 2, wherein the controller is further configured to recognize a rotating gesture pattern by detecting a rotating movement of each of the plurality of touches in a first direction.

9. The mobile terminal of claim 1, further comprising a memory configured to store information related to a plurality of gesture patterns corresponding to the plurality of touches.

10. The mobile terminal of claim 1, wherein the controller is further configured to cause the touchscreen to perform a display operation corresponding to the recognized gesture pattern.

11. A method for recognizing touch inputs in a mobile terminal, the method comprising:

displaying, on a touchscreen of the mobile terminal, information;

capturing, via a camera of the mobile terminal, a plurality of images of a plurality of touches to the touchscreen;

detecting the plurality of touches from the plurality of captured images;

detecting a first touch scheme, a second touch scheme, a third touch scheme, and a fourth touch scheme from the plurality of touches, the first touch scheme and the second touch scheme each comprising at least two touches;

determining patterns and pattern changes of a first intermediate point of the at least two touches of the first touch scheme and a second intermediate point of the at least two touches of the second touch scheme;

recognizing a gesture pattern of the plurality of touches based on the patterns and pattern changes of the first intermediate point and the second intermediate point;

recognizing the third touch scheme as an enlarging gesture, wherein the third touch scheme comprises a first touch and a second touch of the plurality of touches, the first and second touches simultaneously received via the touchscreen, and the second touch located to a right side of the first touch, and wherein the first touch is rotated clockwise while the second touch is rotated counter-clockwise at a same time, each of the first and second touches rotated while maintaining a same respective touch location;

enlarging the displayed information based on the recognized third touch scheme;

recognizing the fourth touch scheme as a reducing gesture, wherein the fourth touch scheme comprises a third touch and a fourth touch of the plurality of touches, the fourth touch located to a right side of the third touch, and wherein the third touch is rotated counter-clockwise while the fourth touch is rotated clockwise at a same time, each of the third and fourth touches rotated while maintaining a same respective touch location; and reducing the displayed information based on the recognized fourth touch scheme.

12. The method of claim 11, wherein the gesture pattern is further recognized by detecting at least a moved distance, a moved direction, or a change in distance from a particular point of each of the plurality of touches.

13. The method of claim 11, wherein recognizing the gesture pattern further comprises:

recognizing a reducing gesture pattern when the moved direction of each of the plurality of touches is a direction converging toward a particular point;

recognizing an enlarging gesture pattern when the moved direction of each of the plurality of touches is a direction expanding away from a particular point; and recognizing a rotating gesture pattern when the moved direction of each of the plurality of touches is circular about a particular point in a first direction.

14. The method of claim 12, further comprising:

grouping at least two touches of the plurality of touches, wherein a detected moved direction of each of the at least two touches comprise a same direction; and generating a representative touch of the grouped at least two touches.

15. The method of claim 14, further comprising detecting at least a shift gesture pattern or a scroll gesture pattern in response to a moved distance or a moved direction of the representative touch.

* * * * *